Figure 1:
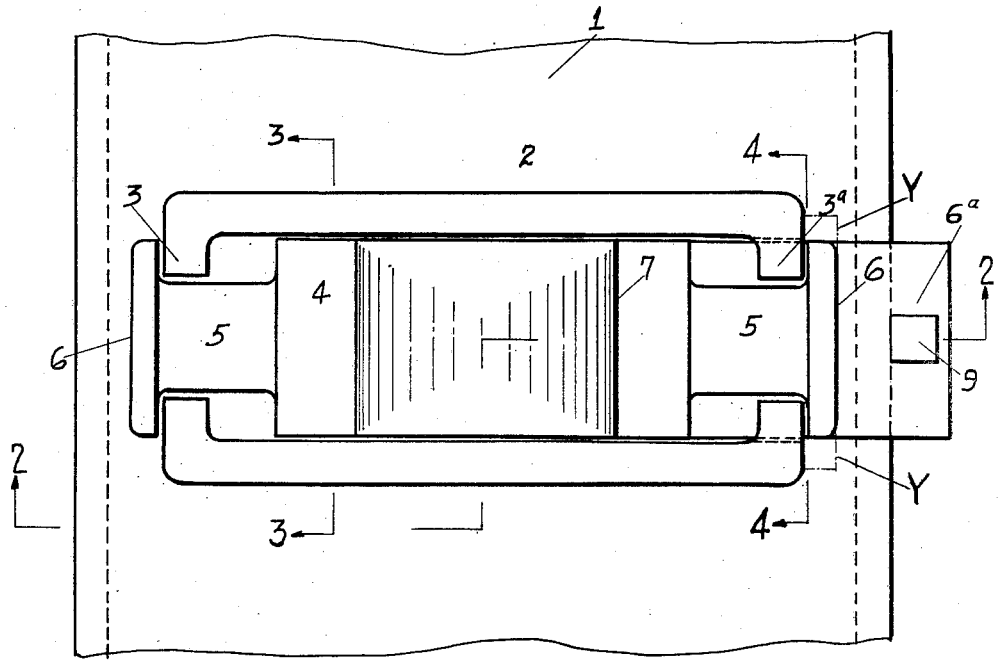

Aug. 8, 1939.   A. B. SEVERN   2,169,074
SIDE BEARING
Filed Sept. 7, 1938   3 Sheets-Sheet 1

INVENTOR.
Arthur B. Severn.
BY
ATTORNEYS.

INVENTOR.
Arthur B. Severn
BY
ATTORNEYS.

Aug. 8, 1939.   A. B. SEVERN   2,169,074
SIDE BEARING
Filed Sept. 7, 1938   3 Sheets-Sheet 3

INVENTOR.
Arthur B. Severn
BY
ATTORNEYS.

Patented Aug. 8, 1939

2,169,074

UNITED STATES PATENT OFFICE 2,169,074

SIDE BEARING

Arthur B. Severn, Pittsburgh, Pa., assignor to A. Stucki, Pittsburgh, Pa.

Application September 7, 1938, Serial No. 228,757

5 Claims. (Cl. 308—226)

Roller side bearings of the type described when used upon railroad cars are disposed between the underside of the car body and the car truck, the purpose of such bearing being to regulate the clearance between the car truck and the body on opposite sides of the support for the body upon the car truck. In order to better perform this function the side bearing must be made adjustable, i. e. the roller must be adjustable vertically relative to the car truck.

In the construction of new cars the proper clearance is established between the roller side bearing and the body and as the car parts wear, this clearance changes and it is necessary to again re-establish the proper clearance between the side bearing roller and the car body. In the original construction of the cars some bearings require greater adjustments than others due to variations in the manufacture of the various car parts or bearings, or both. Thus, in order to meet all conditions the roller side bearing must be capable of adjustment upwardly as well as downwardly.

Various methods have been employed to accomplish this adjustment. When the roller housing is made separate from the supporting car part shims could originally be disposed beneath the housing. However, future adjustments would, in such cases, necessitate cutting the fastening members securing the housing to the supporting car part which was expensive and inconvenient. In cases where the roller housing is formed integrally with the car truck bolster shims may be placed within the housing beneath the roller for accomplishing the desired adjustment. It is also to be noted here that even in the case of removable housings, these removable shims may be disposed within the housing if desired.

Most adjustments in side bearing clearance for wearing of car parts are made by lowering the roller of the side bearing, which is accomplished by removing shims from within the housing. Unless the shims are readily removable it has been found necessary to raise the car body by means of jacks so that the roller may be raised in order to remove the shims.

In the present invention it is the general object to provide an improved roller housing and bearing plate to facilitate insertion or removal of shims during the original construction of the cars and to facilitate insertion or removal of shims for the purpose of subsequent adjustment after the cars have been in use and without employing jacks or other means to raise the car body except in those exceptional cases where the body is resting upon the roller.

Another object of the invention is to provide improved means upon the housing and roller plate for reception and retention of the shims.

A further object of the invention is to provide for the use of a larger number of shims than heretofore provided.

Figure 2:
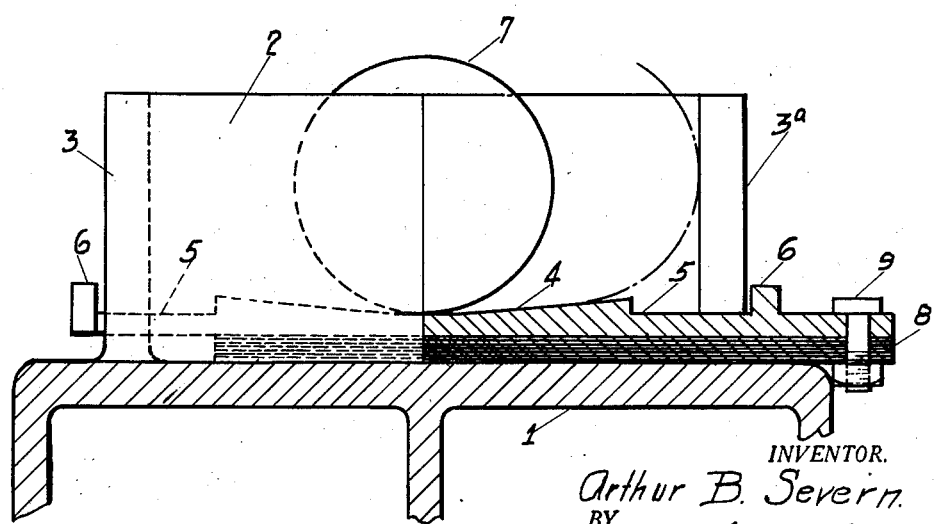
Figures 3, 4:
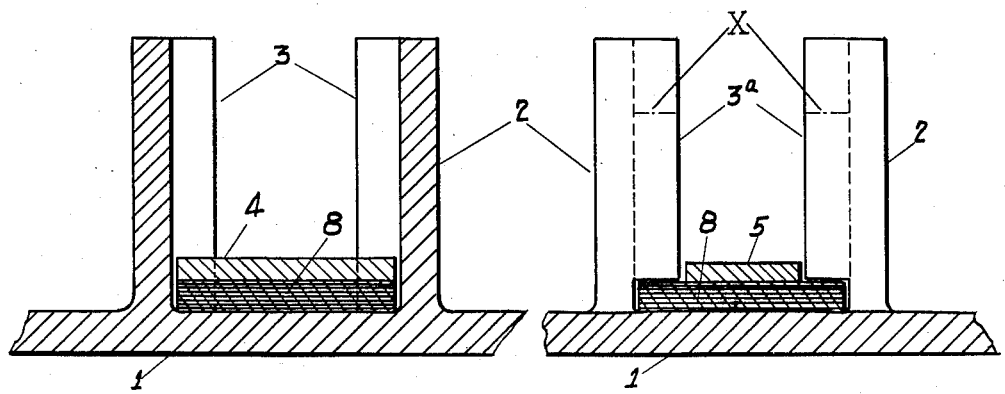
Figure 5:
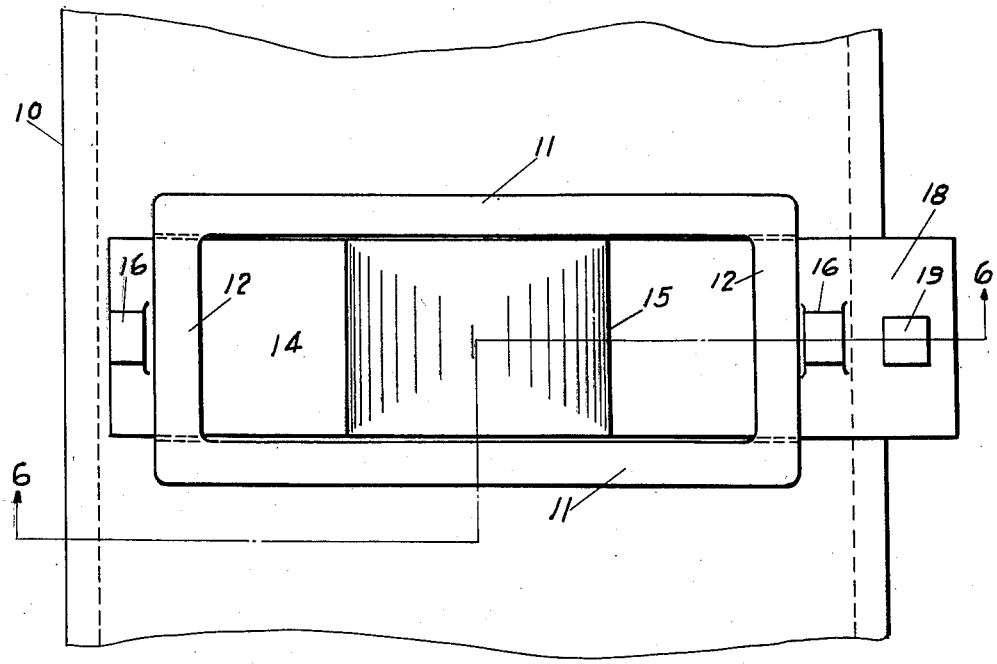
Figure 6:
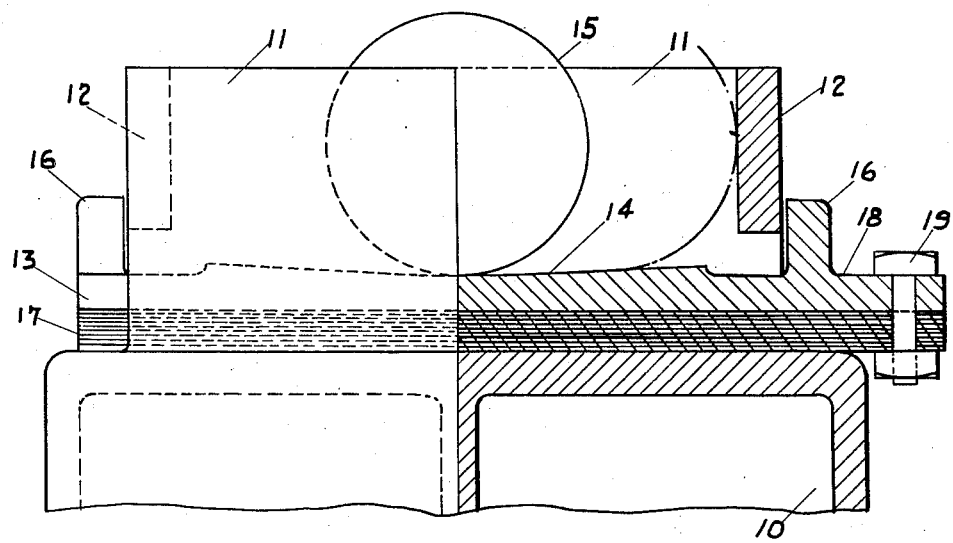
Figures 7, 8:
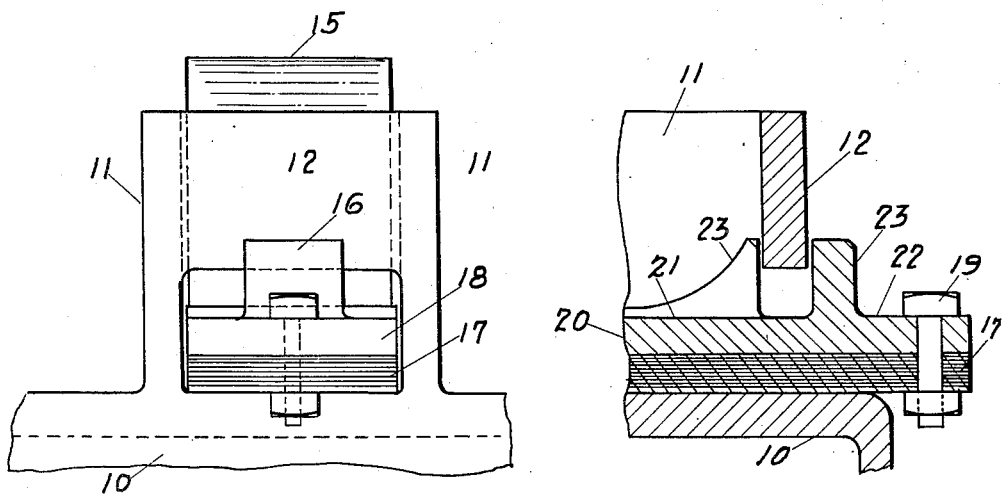

In the drawings forming a part of this specification, Fig. 1 shows in plan one form of the invention; Fig. 2 illustrates a section taken on the lines 2—2 of Fig. 1 showing the roller bearing partly in elevation and partly in section; Figs. 3 and 4 show opposite end elevations of the bearing; Fig. 5 shows in plan a modification of the invention; Fig. 6 is a view partly in elevation and partly in section taken on the lines 6—6 of Fig. 5; Fig. 7 shows an end elevation of the bearing of Fig. 5; and Fig. 8 shows a further modification in the roller bearing plate.

Referring now in detail to the drawings wherein like reference characters refer to like parts, reference character 1 indicates a portion of a truck bolster upon which is integrally formed the improved housing comprising side walls 2 extending upwardly from the bolster and having opposing flanges 3 and 3ª at each end thereof. As illustrated in Fig. 1 of the drawings, these flanges are of a length substantially less than one-half the spacing between the side walls 2 so that the housing is open at the top and at the ends for the reception of a roller bearing plate 4. This bearing plate comprises a central portion provided with a concave upper face for support of the roller, intermediate portions 5 of less width than the central portion and extending between the flanges 3 and 3ª of the side walls 2 of the housing. Each intermediate portion has an end portion 6 disposed beyond the said flanges and of a width greater than the space between the flanges 3 and 3ª to position the bearing plate 4 within the housing.

Disposed between the side walls 2 of the housing and supported by the bearing plate 4 is a roller 7 of sufficient diameter to extend above the side walls of the housing for engagement with the underside of the car body. Due to the concave shape of the upper face of the bearing plate 4 the roller 7 tends to return to the center of the housing when not in engagement with the car body and movement of the roller longitudinally of the bearing plate is restricted by engagement with the said flanges on the side walls 2 of the housing.

Referring now to Figs. 1 and 3 of the drawings the flanges 3ᵃ at one end of the bearing side walls 2 have their bottom portion vertically spaced above the face of the bolster 1 so that shims 8 of a width substantially equal to the width of the central portion of the bearing plate 4 may be inserted into the housing beneath the said bearing plate through the apertures formed by the said spacing of the flanges 3ᵃ. The extent of the vertical spacing of the flanges 3ᵃ above the face of the bolster, as illustrated in Fig. 4 of the drawings, is greater than the total thickness of shims to be used but less than the thickness of the bearing plate at the portion 6. When thus formed the portion 6 of the bearing plate, even in the total absence of any shims, will engage with the flanges 3ᵃ to position the bearing plate 4 in a direction longitudinally of the housing.

For most cases a limited number of shims only are required and the construction illustrated in Fig. 4 and described supra is sufficient to meet all operating conditions. Recognizing there may arise at times conditions requiring a greatly increased number of shims and to provide for this possible condition, the flanges 3ᵃ illustrated in Fig. 4 could be modified by increasing the vertical spacing thereof above the face of the bolster to the required extent as indicated by the lines X, leaving only such portions of the flanges 3ᵃ as are necessary for retention of the roller 7 within the housing. When the housing is so modified a condition could arise wherein sufficient shims were removed from beneath the bearing plate 4 so that the portion 6 thereof would no longer engage the flanges 3ᵃ and the bearing plate 4 could shift longitudinally within the housing. To prevent such condition, when the flanges 3ᵃ are modified as herein described, I propose to extend the portion 6 transversely of the bearing plate sufficiently to engage with the walls 2 of the housing as indicated at Y on Fig. 1. When so modified longitudinal shifting of the bearing plate 4 within the housing would be prevented regardless of the number of shims employed.

For purposes of securing the shims 8 within the housing I propose to form an extension 6ᵃ on one end portion 6 of the bearing plate, which extension preferably overhangs the side of the bolster and placing aligned apertures in the extension 6ᵃ and the shims 8 for reception of a suitable fastening member, such as the bolt 9, securing the bearing plate and shims together and preventing accidental displacement of the shims.

As illustrated in Fig. 2 of the drawings the shims preferably extend only beneath the mid portion of the bearing plate 4, thereby reducing the weight and cost of the shims and making it unnecessary to space the flanges 3 above the bolster as are the flanges 3ᵃ.

In assembling the bearing, the bearing plate 4 is placed within the housing through the top opening and having the intermediate portions 5 extending between the flanges 3 and 3ᵃ. The roller is then placed within the housing upon the bearing plate 4 and the requisite number of shims 8 are placed beneath the bearing plate 4 through the openings in the housing beneath the flanges 3ᵃ of the housing side walls.

As previously stated, in the majority of cases adjustment after the cars are put in use is effected by removing shims when the clearance between the underside of the car body and the roller 7 becomes less than the standard set up by the car user. In such cases to increase the said clearance the bolt 9 is removed and the requisite number of shims are removed. In this operation it will be noted that once the bolt 9 has been removed, there are no obstructions to the removal of the shims 8 so that a very slight clearance between the roller 7 and the underside of the body will be sufficient to permit removal of the shims 8. The bolt 9 securing together the shims and bearing plate, in addition to preventing displacement of the shims, also prevents displacement of the roller bearing plate 4 in a vertical direction as any such movement of the plate 4 is limited by engagement between the shims 8 and the undersides of the housing side wall flanges 3ᵃ.

Referring now to Figs. 5 to 7 of the drawings showing a modification of the invention, reference character 10 indicates a portion of a truck bolster upon the upper face of which is integrally formed a roller housing comprising side walls 11 connected by end walls 12. Disposed within the housing is a roller bearing plate 13 comprising a body portion of a length greater than the side walls of the housing so as to project beyond each end thereof and of a width less than the spacing between the side walls 11 to permit insertion within the housing. The central portion of the roller bearing plate has a concave upper face 14 for reception and support of a roller 15 and likewise formed on the upper face of the bearing plate are lugs 16 for engagement with the end walls 12 to position the roller bearing plate within the housing. In order to permit insertion of the bearing plate within the housing the end walls 12 are spaced above the upper face of the bolster 10 a distance greater than the combined height of the lug 16 and the thickness of the bearing plate 13. Shims 17 are inserted within the housing beneath the bearing plate 13 and beneath the end walls 12.

Upon reference to Fig. 6 of the drawings it will be observed that once the bearing plate 13 is in position a considerable number of shims 17 can be inserted beneath the bearing plate before the bearing plate engages the bottom of walls 12. However, in the removal of the shims a condition might arise where sufficient shims were removed to lower the top of the lug 16 below the under face of the walls 12 of the housing to permit separation of the roller bearing plate 13 and the housing. To prevent this condition arising I propose to maintain at all times one or more shims beneath the bearing plate and to maintain the relation between the spacing of the bottom of the walls 12 from the face of the bolster and the total depth of the lug 16 and the thickness of the bearing plate 13 such that said total depth plus the retained shims is greater than the spacing of the walls 12 from the bolster. As shown in Figs. 1 to 3 inclusive, I propose to extend one end of the bearing plate 13 beyond the lug 16 as at 18 and place aligned apertures in the extension and the shim 17 for reception of a bolt 19 securing together the shims and bearing plate. As in the preferred form of the invention, the shims 17 may be readily removed from the housing with only a slight clearance between the roller 15 and the underside of the car when the bolt 19 is not in position, thereby permitting adjustment without raising the car body and making possible adjustment without returning the car to the shops.

Referring now to Fig. 8 of the drawing showing a modification of the bearing plate, the bearing plate 20 is in many respects similar to the bearing plate of Fig. 5 and differing therefrom in that it extends beyond but one end wall of the housing and comprises a portion 21 supporting the roller and a portion 22 extending through the aperture in the housing end wall 12 and beyond for connection with the shims. Upon the portion 22 are spaced upwardly extending lugs 23 adapted to be disposed upon opposite sides of the apertured end wall 12 to resist relative movement between the bearing plate and housing. As in Fig. 5 the total height of the lugs 23 above the base of the bearing plate is less than the height of the aperture in end wall 12 so that the bearing plate may be inserted within the housing before shims 17 are inserted and thereafter move vertically upward with lugs 23 on opposite sides of the housing end wall to permit insertion of the shims beneath the bearing plate.

Having thus described the invention what I claim as new and desire to secure by Letters Patent is:

1. In an adjustable side bearing in combination, a housing including a base, opposite side walls extending upwardly from said base, end walls constituted as opposing flanges on said side walls and an open top, a roller bearing plate disposed between said housing side walls and comprising a central portion providing support for a roller, narrowed intermediate portions extending between and beyond said opposing flanges at each end of said side walls, and end portions adapted to engage said flanges to position the bearing plate longitudinally of said housing, said flanges at one end of said housing being spaced above said base, shims disposed in the opening formed by spacing the flanges above said base and extending within said housing beneath said bearing plate central portion, an extension on one of said bearing plate end portions, and detachable means connecting said shims and extension.

2. In an adjustable side bearing in combination, a housing integrally formed upon a truck bolster and including a base, spaced side walls extending upwardly from said base, spaced opposing flanges on said side walls constituting the end walls of said housing, a roller within said housing and extending above said housing side walls, a bearing plate beneath the roller and comprising a central portion engaged by said roller, intermediate portions extending between said spaced flanges and terminating in end portions spaced outwardly of and across said flanges to position the bearing plate longitudinally of the housing, said opposing flanges at one end of the housing being spaced above said housing base for insertion of shims within said housing, shims in said housing disposed beneath said bearing plate and extending beyond one housing end wall beneath said side wall flanges, and means retaining said shims against accidental displacement.

3. In an adjustable side bearing in combination, a housing including a base, spaced side walls and end walls constituted as opposing flanges on said side walls, said opposing flanges being spaced apart throughout the depth of said side walls, said flanges at one end wall being vertically spaced above said housing base, a plurality of shims insertable in said housing through said later end wall, beneath said vertically spaced side wall flanges and extending outwardly of said later end wall, a roller bearing plate supported by said shims and provided with a portion formed to pass between said latter end wall flanges and extending beyond the end wall of the housing to overlie the extensions of said shims, a roller supported by said roller bearing plate and movable longitudinally thereof between said housing end walls, and means releasably connecting said roller bearing plate and shim extensions.

4. In an adjustable side bearing in combination, a housing including a base, spaced side walls, end walls and an open top, one of said end walls being formed of spaced side wall flanges terminating above said base, a roller within said housing and moving between said end walls, a roller bearing plate comprising a portion disposed between said side walls to support said roller, a narrowed portion extending between said spaced side wall flanges, and an end portion disposed outwardly of said flanges and transversely thereof, shims inserted within said housing and extending beneath said flanges between said bearing plate and housing base, and detachable means connecting said bearing plate and shims.

5. In an adjustable roller side bearing in combination, a housing including a base, spaced side walls and connecting end walls, an aperture in one of said end walls extending between said side walls and upwardly from said base, a roller within said housing and moving between said end walls, a bearing member comprising a portion supporting said roller for movement longitudinally thereof, a portion extending beyond the end wall and through the aperture therein, means on said latter portion extending above same on opposite sides of said apertured end wall, shims insertable through said end wall aperture between said bearing member and housing base and extending from said roller supporting portion to the end of said bearing member exteriorly of said apertured end wall, and detachable means connecting said shims and bearing member extension to prevent accidental displacement of said shims.

ARTHUR B. SEVERN.